(12) United States Patent
Kim et al.

(10) Patent No.: US 6,344,879 B1
(45) Date of Patent: Feb. 5, 2002

(54) APPARATUS AND METHOD FOR CAPTURING OBJECT IN TV PROGRAM

(75) Inventors: Jae Ryong Kim; Mun Youl Lee, both of Kyonggi-do; Sung A Cho, Seoul; Sang Won Chung, Kyonggi-do; Se Jung Sohn, Seoul, all of (KR)

(73) Assignee: LG Electronics Inc., Seoul (KR)

( * ) Notice: Subject to any disclaimer, the term of this patent is extended or adjusted under 35 U.S.C. 154(b) by 0 days.

(21) Appl. No.: 09/492,385

(22) Filed: Jan. 27, 2000

(30) Foreign Application Priority Data

Jan. 26, 1999 (KR) .............................................. 99-2376

(51) Int. Cl.[7] .............................................. H04N 5/44
(52) U.S. Cl. ........................................ 348/553; 348/725
(58) Field of Search ................................. 348/553, 563, 348/571, 576, 578, 725, 731, 726; H04N 5/44, 5/14

(56) References Cited

U.S. PATENT DOCUMENTS 6,256,071 B1 * 7/2001 Hiroi .......................... 348/553

* cited by examiner

Primary Examiner—Sherrie Hsia

(57) ABSTRACT

An apparatus and method for capturing an object in a TV program to display or print an object selected by a user is disclosed. The present invention includes a media object description table decoder to generate a data file corresponding to the object captured among the image frames being displayed on a display unit.

17 Claims, 4 Drawing Sheets

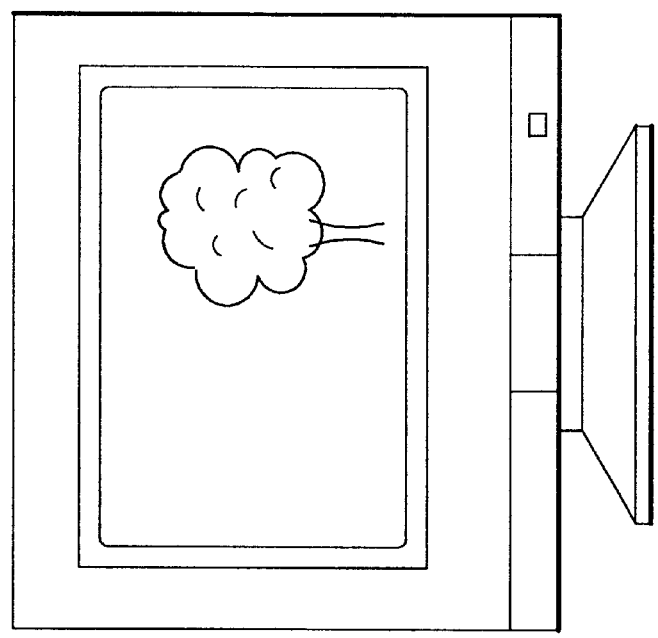
FIG.4
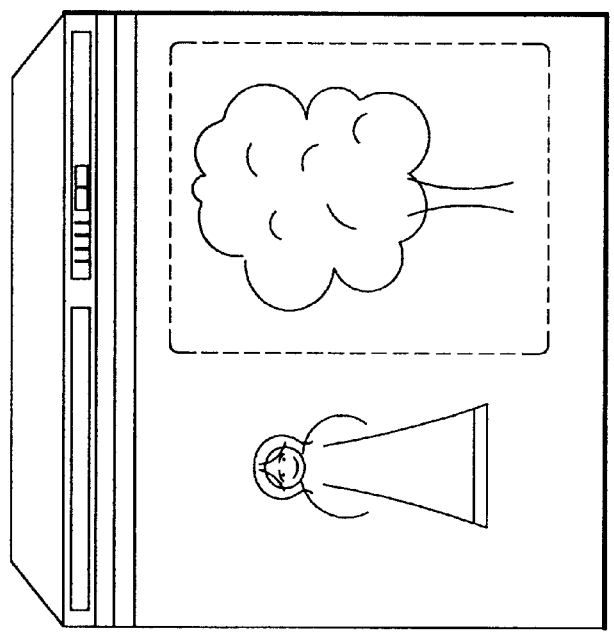

APPARATUS AND METHOD FOR CAPTURING OBJECT IN TV PROGRAM

BACKGROUND OF THE INVENTION

1. Field of the Invention

The present invention relates to a TV program and more particularly, to an apparatus and method for capturing an object in a TV program.

2. Discussion of Related Art

FIG. 1 shows a typical construction of a television (TV) including a remote control 1 which allows a wireless control of the TV by a user; a remote receiver 2 which receives and outputs a signal from the remote control 1; a tuner 3 which tunes a signal received through an antenna; a demultiplexer 4 which separates the tuned signal into an audio/video signal and additional information data; an audio/video decoder 5 which decodes the audio/video signal from the demultiplexer 4; a display unit 6 which displays the decoded signal; a storage 7 which stores the additional information data; a controller 8 which controls the demultiplexer 4 in response to the signal from the remote receiver 2 and extracting the additional information data stored in the storage 7 to output a corresponding control signal; and a memory 9 which temporarily stores the data extracted from the storage 7.

To view a TV program by the television of FIG. 1, the user selects a program from broadcasting stations or external program providers by using the remote control 1. The remote receiver 2 receives a signal indicating a selected program from the remote control 1 and outputs a corresponding signal to the controller 8. Thus, the controller 8 outputs a control signal to tune the program selected by the user in response to the signal from the remote receiver 2. Also in response to the signal from the remote receiver 2, the controller 8 outputs a control signal to separate the program of a broadcasting station or an external program provider selected by the user.

The tuner 3 receives signals through an antenna and tunes a signal of the broadcasting station or the external program provider with the program selected by the user in response to the control signal from the controller 8. The tuned signal is output to the demultiplexer 4, through which the program selected by the user separated into audio/video signal and the additional information data, in response to the control from the controller 8. The additional information data includes an electronic program guide (EPG) data or information regarding objects such as a particular actor or actress in a TV program being displayed.

The audio/video decoder 5 receives and decodes the audio/video signal from the demultiplexer 4 and outputs a decoded signal. Accordingly, the display unit 6 displays the program selected by the user in response to the signal output from the audio/video decoder 5. The additional information data is received and stored in the storage 7 in response to the control signal of the controller 8. The controller 8 extracts the additional information data corresponding to a program being displayed on the display unit 6 from the storage 7 and stores the extracted information in the memory 9. Thereafter, the additional information data for the program being displayed is read from the memory 9 and signal processed to be displayed. Finally, a prescribed message is displayed through the display unit 9 to inform that there is additional information for the program currently being displayed.

The TV as described above can process, reproduce TV programs and display additional information about objects in the TV program on the TV screen. However, a user may wish to select an object from an image frame currently being displayed, and display or print the additional information regarding selected object. Because the TV in the related art does not have such function or capability, a limited service is provided to users.

SUMMARY OF THE INVENTION

Accordingly, an object of the present invention is to solve at least the problems and disadvantages of the related art.

An object of the present invention is to provide an apparatus and method for capturing an object in a TV program being displayed and displaying the captured object on other displaying equipment.

An object of the present invention is to provide an apparatus and method for capturing an object in a TV program being displayed and printing the captured object Additional advantages, objects, and features of the invention will be set forth in part in the description which follows and in part will become apparent to those having ordinary skill in the art upon examination of the following or may be learned from practice of the invention. The objects and advantages of the invention may be realized and attained as particularly pointed out in the appended claims.

To achieve the objects and in accordance with the purposes of the invention, as embodied and broadly described herein, an apparatus for capturing an object in a TV program includes a Media Object Description Table (MODT) decoder for decoding additional information data from a demultiplexer into a plurality of MODT data; an object data memory for storing the plurality of MODT data; a controller for controlling the demultiplexer in response to a signal from a remote receiver, extracting the MODT data stored in the object data memory and outputting a corresponding control signal to display various additional information; and an output device for converting the extracted MODT data corresponding to a captured object into a data file of a specific format according to a control of the controller. The MODT data corresponds to an object captured among image frames currently being displayed on a display unit.

A method for capturing an object in a TV program in accordance with the present invention comprises capturing an object desired by a user from an image frame being displayed; extracting the data corresponding to the captured object; signal processing and outputting the extracted data; and converting the signal processed data into a data file of a specific format, and displaying or printing the file. The displaying or printing step may further comprise moving, and enlarging or reducing the data after converting the data into a file of a specific format.

BRIEF DESCRIPTION OF THE ATTACHED DRAWINGS

The invention will be described in detail with reference to the following drawings in which like reference numerals refer to like elements wherein:

FIG. 4 shows the method for capturing an object being displayed on a display unit of FIG. 2.

DETAILED DESCRIPTION OF PREFERRED EMBODIMENT

Figure 1:
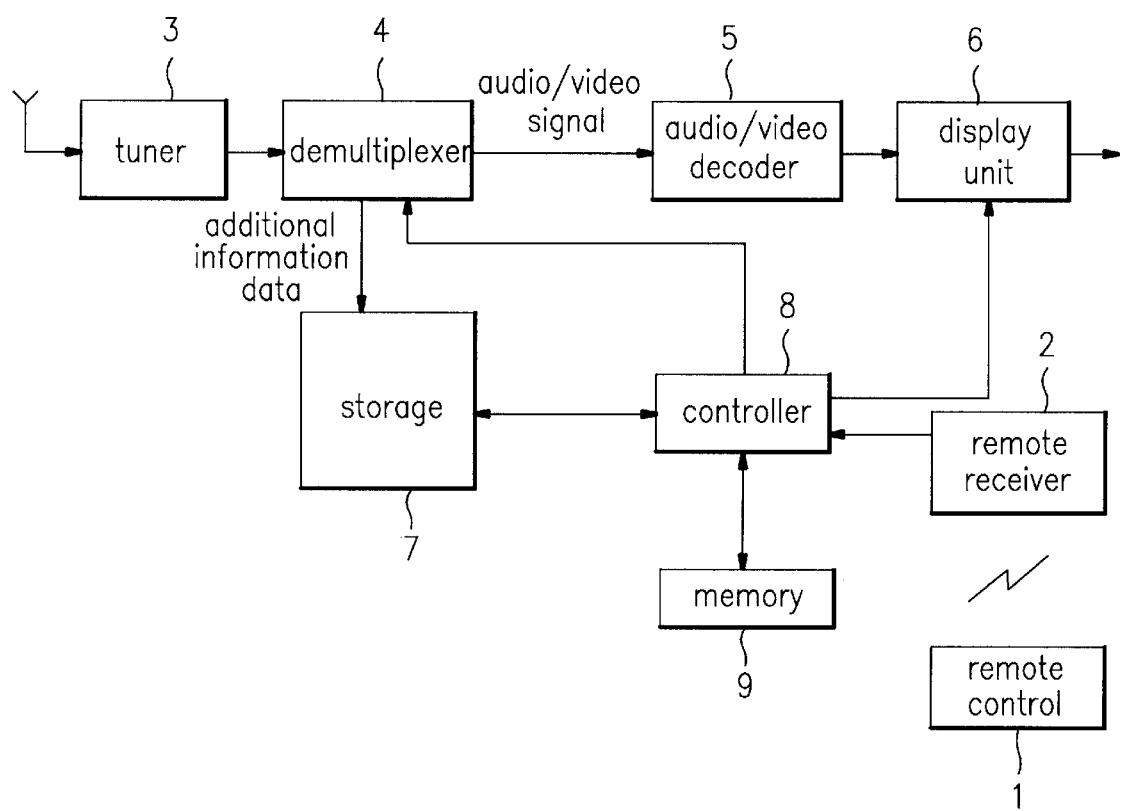
FIG. 1 is a block diagram showing a construction of a TV in the related art.
Figure 2:
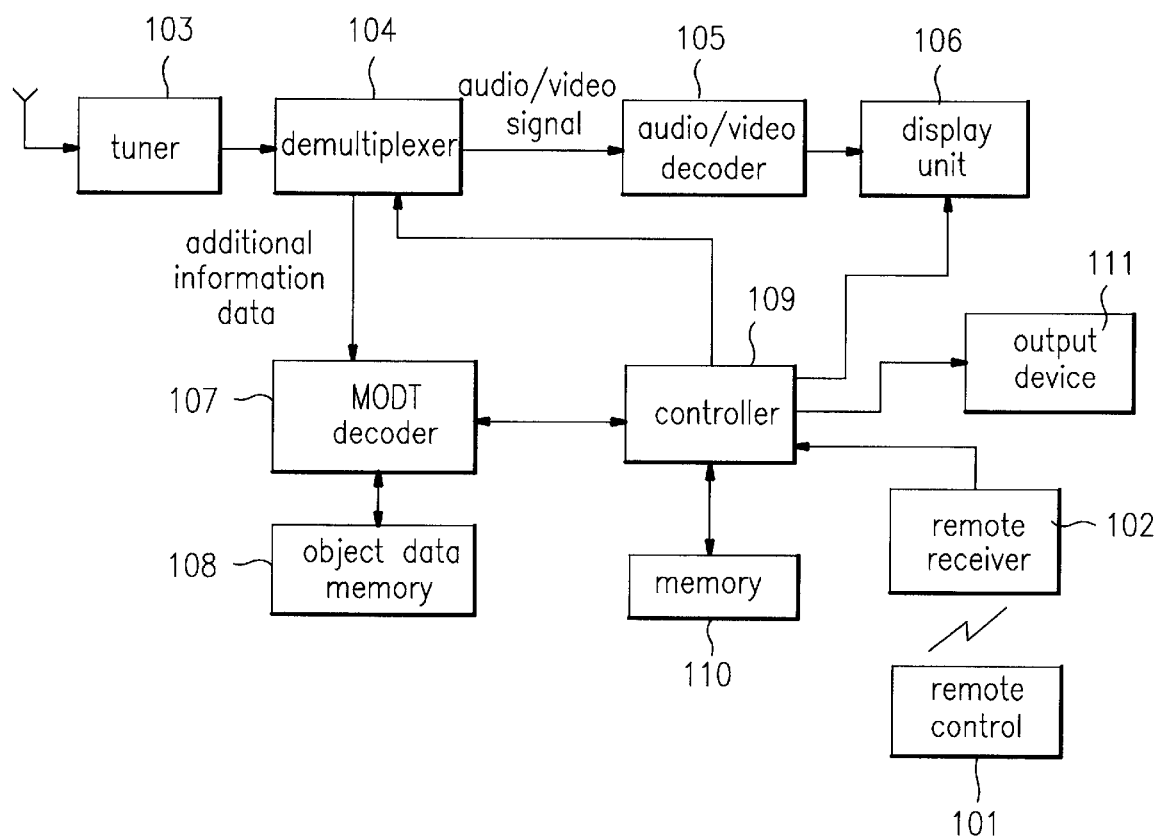
FIG. 2 is a block diagram of an apparatus for capturing an object in a TV program in accordance with the present invention.

Reference will now be made in detail to the preferred embodiments of the present invention, examples of which are illustrated in the accompanying drawings. Particularly, FIG. 2 is a block diagram showing a construction of an apparatus for capturing an object in a TV program in accordance with the present invention.

As in a typical TV, the present apparatus includes a remote control 101 which allows a wireless control of a TV by a user; a remote receiver 102 which receives a signal output by the remote control 101 and outputs a corresponding signal; a tuner 103 which tunes a multiplexed signal received through a channel; a demultiplexer 104 which demultiplexes a signal containing a program selected by a user from the tuned signal and separates the demultiplexed signal into an audio/video signal and additional information data; an audio/video decoder 105 which decodes the audio/video signal from the demultiplexer 104; and a display unit 106 which displays the decoded signal.

The apparatus for capturing an object in a TV program according to the present invention further includes a MODT decoder 107 which decodes the additional information data from the demultiplexer 104 into a plurality of MODT data; an object data memory 108 which stores the plurality of MODT data; a controller 109 which controls the demultiplexer 104 and the display unit 106 in response to the signal from the remote receiver 102, and extracts the MODT data stored in the object data memory 108 to output a corresponding control signal; a memory 110 which stores the MODT data extracted from the object data memory 108 in response to a control of the controller 109; and an output device 111 which converts the extracted MODT data corresponding to an object captured in an image frame being displayed on the display unit 106 into a file of a specific format in response to a control signal of the controller 109.

Figure 3:
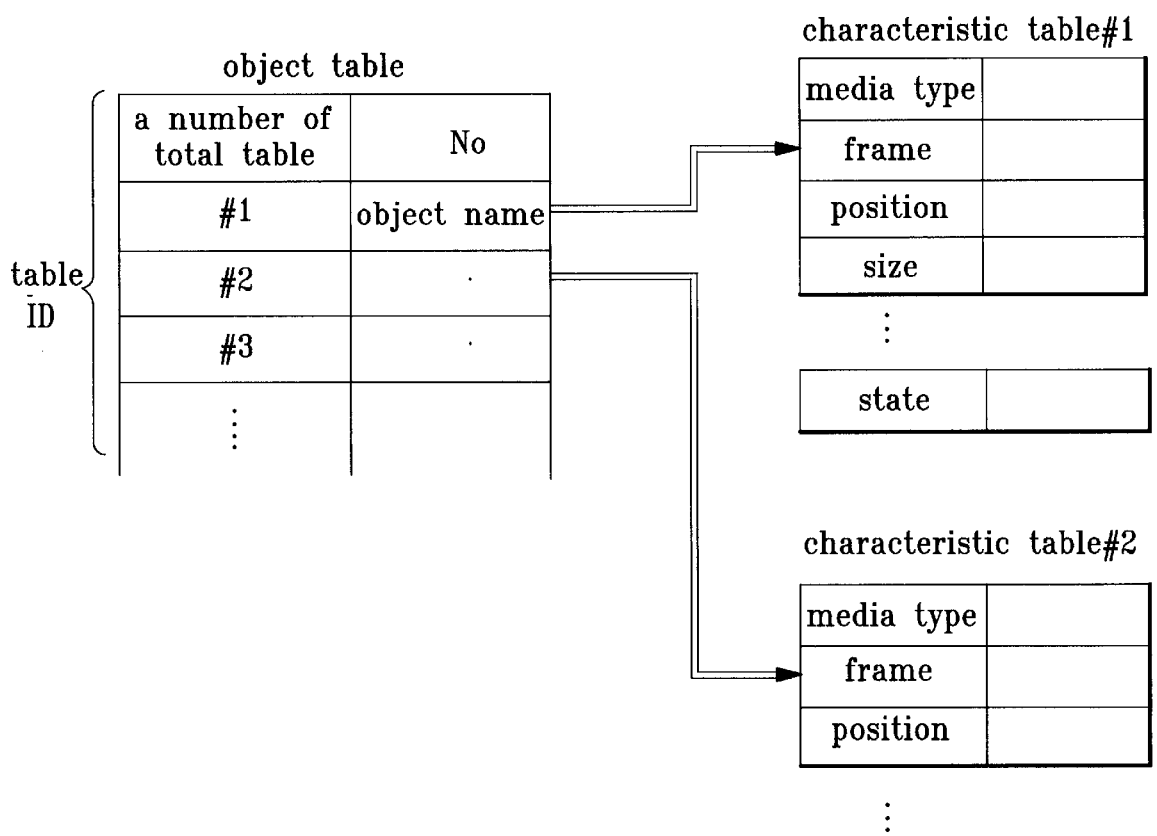
FIG. 3 is an example of an object table in accordance with the present invention.

In the above apparatus, the MODT decoder decodes the additional information data such as facts or news about objects in the TV program and organizes the additional information in object tables. FIG. 3 shows an example of the object table stored in the object data memory 108. As shown, an object table includes a number of total tables and table IDs for the programs, object names from the broadcasting station or the external program providers, and characteristics tables. The characteristic tables include information such as media types, a number of frames, positions, sizes and states of an objects for each table ID in the object table. Here, the media type is, for example, an audio, a video, or a character.

Also, in the preferred embodiment, the extracted MODT data, i.e. additional information regarding a captured object, is converted into a picture file. Thus, information regarding the captured image may be printed or displayed through the output device 111. Moreover, a user may edit picture file prior to displaying or printing the information regarding the captured object. The present method will next be explained in detail with reference to FIGS. 3 and 4.

A user first selects a program among programs provided by broadcasting stations or external program providers using the remote control 101. The remote receiver 102 receives a signal of the remote control 101 which indicates a selected program and outputs a corresponding signal to the controller 109. In response to the signal from the remote receiver 102, the controller 109 outputs a control signal to tune and separate selected program from the received signals. Also, the controller 109 outputs a signal for controlling the MODT decoder 107 in response to the signal of the remote receiver 102.

Thus, the tuner 103 tunes a signal which includes the selected program the signals transmitted by the broadcasting station or the external program provider, in response to the control signal output by the controller 109, and outputs the tuned signal. Here, the programs included in the signals of the broadcasting station or the external program provider may be received through air through an antenna or by a cable. Thereafter, the demultiplexer 104 demultiplexes the selected program from the tuned signal in response to the control signal output by the controller 109, and separates the demultiplexed signal into the audio/video signal and the additional information data.

The audio/video decoder 105 receives and decodes the audio/video signal and outputs the decoded signal. Accordingly, the display unit 106 displays the program selected by the user in response to the signal output from the audio/video decoder 105. On the other hand, the MODT decoder 107 receives and decodes the additional information data including data corresponding to objects being displayed on the display unit 106 into a plurality of MODT data, each corresponding to an objects being displayed.

Particularly, the MODT decoder 107 detects detailed information on objects being displayed on the display unit 106, decodes the detailed information on objects into an MODT data, generates object tables as shown in FIG. 3, and stores the object tables in the object data memory 106. Accordingly, the controller 109 informs users of an existence of detailed information on objects stored in the object data memory 106 in addition to the program being displayed. The existence of detailed information on the object may be informed using any one of a user's senses such as sight or sound. For example, an identification figure, such as an icon, or a list in a form of a menu may be used. In the latter case, object names having corresponding detailed information may be provided on the menu. Therefore, a user may press a key on the remote control 101 to request a display of the detailed information on an object according to the message that there is detailed information.

Here, the object may be a person or thing within a frame being displayed. For example, an image frame being displayed on the display unit 106 may include a person and a tree as shown in FIG. 4. If a user wishes to display or print the additional information regarding the tree on a different output device, the user may capture the tree using the remote control 101. By entering an input such as by pressing a predetermined key, the remote receiver 102 receives the captured object, i.e. the tree, and outputs the corresponding signal to the controller 109. Here, any remote control device such as a mouse point or a square cursor capable of capturing an object may be utilized to capture the object.

Thus, the controller 109 stills the image frame being displayed on the display unit 106 in response to the signal from the remote receiver 102, extracts the MODT data corresponding to the captured object from the object data memory 108 and signal processes the extracted MODT data. Subsequently, the output device 111 receives and converts the signal processed data corresponding to the object into a file of a specific format in response to the signal from the controller 109. The file may be edited by moving, and enlarging or reducing before display or printing.

According to the present invention apparatus and method for capturing an object in a TV program, a user has an additional function of editing an object being displayed by capturing the object. Thus, the object may be displayed through a different display device or be printed as a hardcopy.

The foregoing embodiments are merely exemplary and are not to be construed as limiting the present invention. The present teachings can be readily applied to other types of apparatuses. The description of the present invention is intended to be illustrative, and not to limit the scope of the claims. Many alternatives, modifications, and variations will be apparent to those skilled in the art.

What is claimed is:

1. An apparatus for reproducing a TV program signal comprising:
   a tuner which tunes a multiplexed signal received through a channel;
   a demultiplexer which demultiplexes a signal containing a program selected by a user from the tuned signal and separates the demultiplexed signal into an audio/video signal and additional information data;
   a display processing unit which decodes and displays the audio/video signal from the demultiplexer as a TV program;
   a MODT decoder which decodes the additional information data from the demultiplexer into a plurality of MODT data;
   an object data memory which stores the plurality of MODT data;
   a controller which controls the demultiplexer and the display processing unit, and extracts an MODT data stored in the object data memory to output a corresponding first control signal, wherein said extracted MODT data corresponds to an object captured in a TV program being displayed; and
   an output device which converts said extracted MODT data into a file of a specific format in response to said first control signal of the controller.

2. An apparatus of claim 1, wherein the tuner receives the multiplexed signal transmitted through air or by cable.

3. An apparatus of claim 1, wherein the display processing unit comprises:
   an audio/video signal decoder which receives and decodes the audio/video signal and outputs the decoded signal; and
   a display unit which displays the decoded signal as the TV program.

4. An apparatus of claim 1, further comprising:
   a remote control which allows a wireless control of a TV by a user and capture of an object in a TV program being displayed; and
   a remote receiver which receives a signal output by the remote control and outputs a signal to the controller, wherein the controller controls the demultiplexer and the display processing unit in response to said signal from the remote receiver.

5. An apparatus of claim 4, wherein the remote control is a mouse point or a square cursor capable of capturing an object in a TV program.

6. An apparatus of claim 1, further comprising a memory which stores said extracted MODT data in response to a second control of output by the controller prior to converting said extracted MODT data by the output device.

7. An apparatus of claim 1, wherein the output device converts said extracted MODT data into a picture file.

8. An apparatus of claim 1, wherein the output device either displays or prints the file of a specific format.

9. An apparatus of claim 8, wherein the file of a specific format can be moved, enlarged or reduced by a user before display or printing.

10. A method for reproducing a TV program signal comprising:
    (a) tuning a multiplexed signal received through a channel;
    (b) demultiplexes a signal containing a program selected by a user from the tuned signal and separating the demultiplexed signal into an audio/video signal and additional information data;
    (c) decoding and displaying the audio/video signal as a TV program;
    (d) decoding the additional information data into a plurality of MODT data and storing the plurality of MODT data;
    (e) extracting an MODT data from the plurality of stored MODT data and outputting a corresponding first control signal, wherein said extracted MODT data corresponds to an object captured in a TV program being displayed; and
    (f) converting said extracted MODT data into a file of a specific format in response to said first control signal of the controller.

11. A method of claim 10, wherein in (a) tuning a multiplexed signal transmitted through air or by cable.

12. A method of claim 10, further comprising:
    allowing a wireless control of a TV and a capture of an object in a TV program being displayed by a user through a remote control; and
    receiving a signal output by the remote control and outputting a signal to control the demultiplexing in (b) and the displaying in (c).

13. A method of claim 12, wherein the remote control is a mouse point or a square cursor capable of capturing an object in a TV program.

14. A method of claim 10, further comprising storing said extracted MODT data prior (f), in response to a second control of output by the controller.

15. A method of claim 10, wherein in (f) converting said MODT data into a picture file.

16. A method of claim 10, wherein in (f) either displaying or printing the file of a specific format.

17. A method of claim 16, wherein the file of a specific format can be moved, enlarged or reduced by a user before display or printing.

* * * * *